US008482877B2

(12) United States Patent
Akagi et al.

(10) Patent No.: US 8,482,877 B2
(45) Date of Patent: Jul. 9, 2013

(54) MAGNETIC RECORDING MEDIA, METHOD FOR SERVOWRITING ON SAME, AND HARD DISK DRIVE

(75) Inventors: Kyo Akagi, Tokyo (JP); Hiroshi Ikekame, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 1378 days.

(21) Appl. No.: 12/079,474

(22) Filed: Mar. 26, 2008

(65) Prior Publication Data

US 2008/0239906 A1    Oct. 2, 2008

(30) Foreign Application Priority Data

Mar. 26, 2007   (JP) .................................. 2007-080162

(51) Int. Cl.
*G11B 5/596*   (2006.01)
(52) U.S. Cl.
USPC ........................................ 360/77.04; 360/135
(58) Field of Classification Search
None
See application file for complete search history.

(56) References Cited

U.S. PATENT DOCUMENTS

| 5,138,511 | A | * | 8/1992 | Hoshimi et al. ........... 360/77.08 |
| 5,485,322 | A | | 1/1996 | Chainer et al. |
| 5,581,420 | A | | 12/1996 | Chainer et al. |
| 5,612,833 | A | | 3/1997 | Yarmchuk et al. |
| 5,615,058 | A | | 3/1997 | Chainer et al. |
| 5,659,436 | A | | 8/1997 | Yarmchuk et al. |
| 6,088,200 | A | * | 7/2000 | Morita ........................... 360/135 |
| 6,751,035 | B1 | * | 6/2004 | Belser ......................... 360/77.08 |
| 7,173,788 | B2 | * | 2/2007 | Nakamura et al. ............... 360/75 |
| 7,209,313 | B2 | * | 4/2007 | Tagami ....................... 360/77.08 |
| 7,262,931 | B2 | * | 8/2007 | Nakamura et al. .......... 360/77.02 |
| 7,265,930 | B2 | * | 9/2007 | Nakamura et al. ............... 360/75 |
| 7,352,526 | B2 | * | 4/2008 | Takaishi ..................... 360/77.08 |
| 7,388,725 | B2 | * | 6/2008 | Sakurai et al. .................. 360/48 |
| 7,440,222 | B2 | * | 10/2008 | Nakamura et al. ......... 360/77.04 |
| 7,474,506 | B2 | * | 1/2009 | Soeno et al. ............... 360/77.08 |
| 7,505,220 | B2 | * | 3/2009 | Soeno et al. ............... 360/77.08 |
| 7,672,075 | B2 | * | 3/2010 | Soeno et al. ............... 360/77.08 |

(Continued)

FOREIGN PATENT DOCUMENTS

| JP | 04-103023 | | 4/1992 |
| JP | 04-103023 | A | 4/1992 |
| JP | 2006-147046 | A | 6/2006 |

OTHER PUBLICATIONS

Schultz et al. "A self-servowrite clocking process," IEEE Transactions on Magnetics 37:1878-1880, (Jul. 2001).

*Primary Examiner* — Hoa T Nguyen
*Assistant Examiner* — James L Habermehl
(74) *Attorney, Agent, or Firm* — Zilka-Kotab, PC

(57) ABSTRACT

Embodiments of the present invention provide a servo write medium, method and device for writing servo information by self servo write on the servo region formed from a flat section of the discrete track medium. The recording or write device yields the same servo characteristics as magnetic servo writing, is superior to pre-patterned servo, and delivers a greater write storage capacity with an even higher recording density. According to one embodiment, a self servo write method is used to write servo information on a flat section formed on a patterned disk on which discrete tracks are formed. Timing detection patterns (grooves) required for controlling the timing along the periphery during self servo write are formed by pre-patterning on the disk, and RRO error signals used for positioning control along the radius are written in the servo information on a flat section of the disk.

14 Claims, 9 Drawing Sheets

U.S. PATENT DOCUMENTS

| | | | |
|---|---|---|---|
| 7,864,485 B2* | 1/2011 | Kobayashi et al. | 360/77.08 |
| 7,898,768 B2* | 3/2011 | Kamata et al. | 360/135 |
| 7,948,707 B2* | 5/2011 | Kim | 360/77.08 |
| 7,990,645 B2* | 8/2011 | Kim | 360/75 |
| 2002/0051315 A1* | 5/2002 | Mundt et al. | 360/135 |
| 2009/0034109 A1* | 2/2009 | Paul et al. | 360/75 |
| 2009/0034115 A1* | 2/2009 | Soeno et al. | 360/77.08 |

* cited by examiner

MAGNETIC RECORDING MEDIA, METHOD FOR SERVOWRITING ON SAME, AND HARD DISK DRIVE

CROSS-REFERENCES TO RELATED APPLICATIONS

The instant nonprovisional patent application claims priority to Japanese Patent Application No. 2007-080162 filed Mar. 26, 2007 and which is incorporated by reference in its entirety herein for all purposes.

BACKGROUND OF THE INVENTION

Data storage devices are known as devices using different types of recording media such as optical disks, optical magnetic disks or flexible magnetic disks, etc. Among these storage devices, computer storage devices called hard disk drives (HDD) are widely used and are indispensable as storage devices in current computer systems. Moreover, hard disk drives are not limited to computer systems and applications including removable memories allow use in video recorders and players, car navigation systems, cellular telephones or digital cameras. The excellent features offered by HDD will ensure an expanded range of applications.

The magnetic disk used in the HDD contains multiple tracks formed concentrically. Data regions and servo regions are formed on each track. The servo regions contain the servo data (servo patterns) and are formed separately along the track circumference. Data regions contain user data and are formed between one servo region and next servo region. A thin-film device functioning as the magnetic head, writes the user data or reads the user data by accessing the desired data region (address) according to the servo data.

Each servo pattern (called, product servo patterns in these specifications) is made up of a cylinder ID, sector numbers, and burst patterns, etc. The cylinder ID indicates the address of the track, and the sector number indicates the sector address within the track. The burst pattern contains magnetic head position information relative to the track.

The product servo patterns are formed in multiple sectors formed circumferentially and at a separate distance on each track as described above. The product servo patterns are arrayed along the circumference at the same position, or in other words, product servo patterns with the same sector number are arrayed at positions (phases) along the circumference across the entire track. The product servo pattern is written on the magnetic disk at the factory prior to HDD product shipment. An external device called a servo track writer is typically utilized to write the servo track data. In this process, the HDD is set in the servo track writer, a positioner (external positioner mechanism) then positions the head on the HDD in the servo track writer, and a product servo pattern generated by the product servo pattern generator circuit is written on the magnetic disk.

The process for writing the product servo pattern (hereafter, servo write process) occupies a lead position in terms of cost in the HDD manufacturing process. Competition to produce HDD with ever larger storage capacity has become particularly fierce in recent years, resulting in an ever larger number of tracks per inch (TPI). A larger TPI results in a greater number of tracks, so the track width (track pitch) becomes smaller. This smaller track width drives up the servo write process cost because more time is needed for servo writing and the servo writer must have greater precision due to the greater track density. Efforts are being made to reduce this cost and include methods for lowering the servo writer cost and reducing the servo writing time.

One method proposed to resolve the above problems is called Self Servo Write (or SSW). Unlike previous servo write methods, SSW utilizes only the basic mechanism within the HDD unit. In this SSW method, an external circuit regulates the spindle motor (SPM) and the voice coil motor (VCM) within the HDD, and writes the product servo pattern. The SSW method in this way attempts to reduce the servo track writer cost.

The SSW method takes advantage of the fact that the read element and write element of the magnetic head are at different positions along the radius (called the read-write offset in these specifications), to position the magnetic head while the read element reads patterns previously written on the inner circumferential or outer circumferential side, and the write element writes new patterns on the desired track separated by the read-write offset. Besides the product servo pattern, the SSW also writes other types of patterns on the recording surface, and utilizes these patterns to control the head positioning and the timing.

The HDD usually contains multiple recording surfaces, and multiple magnetic heads matching these recording surfaces, and an actuator supporting the multiple magnetic heads. The SSW method selects one magnetic head (called a propagation head in these specifications) from among the multiple magnetic heads to read the pattern on the recording surface, and positions the multiple magnetic heads by utilizing the signal on this read out pattern to control the actuator. All the magnetic heads simultaneously write the product servo patterns on the recording surfaces while positioned in this way. The SSW method is described in the following documents: U.S. Pat. No. 5,485,322; U.S. Pat. No. 5,581,420; U.S. Pat. No. 5,612,833; U.S. Pat. No. 5,615,058; U.S. Pat. No. 5,659,436, Japanese Patent Publication No. 1992-103023, and "A self-servowrite clocking process," IEEE Trans Magn., 37, No. 4, pp. 1878-1880 (2001). A description within one or more of these references includes the propagation pattern and timing pattern.

Progress in giving the HDD a higher recording density on the other hand is usually achieved by enhancing the magnetic disk performance and making the track width of the magnetic head narrower. The ultra-thin film making up the magnetic layers as well as the tinier magnetic particles on the magnetic disk cause problems such as magnetization erasure or namely, thermal decay to appear that PMR (perpendicular magnetic recording) attempts to reduce. Some magnetic heads on the other hand have the problem of side-writing where unwanted recording occurs on adjacent tracks due to the spreading magnetic field from the write pole side surface during writing. Moreover, during read, the problem occurs that signals from adjacent tracks are read causing the problem of cross talk noise. These side-write and cross talk problems are difficult to resolve in currently used magnetic recording methods.

Discrete track recording (DTR) is a patterned media technology for alleviating the above problems. The discrete track media (DTM) for this type of recording utilizes the latest nanofabrication technologies such electron beam lithography and imprinting to form patterning on physically and magnetically isolated recording tracks. This discrete track recording suppresses problems such as side-write and cross talk and improves the signal quality.

Besides the discrete track media, bit patterned media (BPM) is also available. BPM also utilizes nanofabrication technology to form patterns the same as DTM. However, the main difference versus DTM is that BPM, allows patterning of recording bits (one bit of magnetic recording is equivalent to a one particle structure) that are physically and magnetically isolated from each other.

Fabricating DTM or BPM or in other words forming servo patterned media (patterned disk) requires pre-forming the servo pattern (servo track) and the track pattern (data track) simultaneously. Servo patterns formed in advance in this way are called pre-patterned servos. If the servo track and the data track are formed separately, then the track centers cannot be aligned so any positioning on a data track by the servo patterns will be meaningless. In other words, accessing the user data is impossible.

Besides the above described pre-patterned servo, another method for making a patterned disk is next described. Namely, a data track holding user data is fabricated as discrete tracks or as bit patterns, and a flat section left remaining without forming any patterns in order to magnetically write on the servo area. The servo can later write on this servo region (hereinafter "plane region"). This technology is described in "A self-servowrite clocking process," IEEE Trans Magn., 37, No. 4, pp. 1878-1880 (2001).

However, various problems clearly emerge in processes where attempting to form the servo track or namely the servo pattern by utilizing electron beam lithography. The SSW method clearly provides the best features when servo characteristics of a disk containing a pre-patterned servo made in advance are compared with a disk magnetically written with servo tracks (servo patterns) by SSW.

Results from investigating causes of deterioration in pre-patterned servo characteristics clearly revealed the following three causes. A first cause is that the read waveform amplitude from the pre-patterned servo is small, and only approximately one-half the amplitude of the servo track magnetically recorded (written) by SSW so the playback (or read) signal-to-noise (S/N) ratio is extremely small. In other words, servo patterns can be magnetically recorded by utilizing the magnetic N pole and S pole but this does not work the same on the pre-patterned servo. In the pre-patterned servo, the servo patterns are formed by physically patterning magnetic units (magnetic thin film) on the disk so that only the magnetic N pole and nothing (or the S pole and nothing) are utilized on the disk.

A second cause is that forming an intricate servo pattern by electron beam lithography is difficult. In other words, the intricate patterning that makes up each servo pattern component such as the PLL, cylinder ID, sector No. and burst pattern within the servo pattern, or namely the pattern dimensions, shape, position accuracy, and other items are worse than those recorded magnetically.

A third cause is an innate problem or namely to what extent the combination of magnetic head and servo pattern match each other. The SSW method is implemented within the HDD so the magnetic head used for forming the servo pattern (servo track write process) is absolutely the same as the head of the actual HDD. The servo track pitch and the dimensions of each servo pattern are in other words exactly the ideal values for the SSW magnetic head unit. The pre-patterned servo on the other hand is determined beforehand by the disk dimensions so one can see that only a magnetic head within a specified range of numerical values can be used.

The above reasons show that the SSW method is superior to the pre-patterned servo method. The SSW method was next used to attempt writing servo patterns on plane regions formed in advance on the disk.

However, attempting to record (write) servo patterns on plane regions preformed on the disk revealed that mainly two large problems occur. One problem lies with along the disk circumference. The servo pattern and the track pattern must be formed so that they are consecutively and accurately positioned in a direction towards the disk periphery (or circumference). Though not occurring in magnetic servos and pre-patterned servos, a method that magnetically records servo patterns later on in the plane region has the problem that at what timing to start magnetic head excitation (or in other words, start servo writing) is unknown unless some type of disk circumferential position information is available. The magnetic head must therefore be supplied with timing information relating to the disk circumference.

Another problem lies along disk radius. The magnetic head must servo-write a servo track (or servo pattern) along the locus of a data track made up of a bit pattern or a discrete track made by pre-patterning. However when a disk pre-patterned with data tracks is attached to a spindle motor, the data tracks will possess an eccentricity as large as several dozen micrometers. In other words, the center of the spindle motor rotation will deviate from the center of the data track locus, so that the magnetic head is not slaved to the data track, consequently causing the problem that servo writing along the data track is impossible. This eccentricity is also a possible reason why achieving a perfectly round (nanometer scale) data track pattern is impossible. A servo write method is therefore needed that is capable of countering the eccentricity occurring along the disk radius.

BRIEF SUMMARY OF THE INVENTION

Embodiments of the present invention provide a servo write medium, method and device for writing servo information by self servo write on the servo region formed from a flat section of the discrete track medium. The recording or write device yields the same servo characteristics as magnetic servo writing and is superior to pre-patterned servo, and delivers a greater write storage capacity with an even higher recording density. According to the particular embodiment of FIG. 1($a$), a self servo write method is used to write servo information on a flat section 112 formed on a patterned disk 11 on which discrete tracks 110 are formed. Timing detection patterns (grooves) 128 required for controlling the timing along the periphery during self servo write are formed by pre-patterning on the disk, and RRO error signals used for positioning control along the radius are written in the servo information on a flat section of the disk.

BRIEF DESCRIPTION OF THE DRAWINGS

FIG. 1($b$) is a diagram showing a pre-patterned servo as a comparative example;

DETAILED DESCRIPTION OF THE INVENTION

Figure 1A:
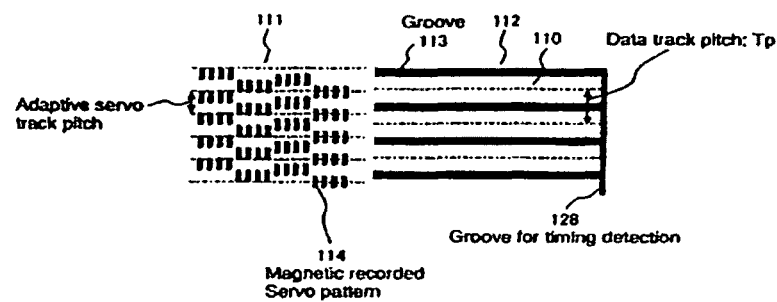
FIG. 1($a$) is a diagram showing the servo pattern recorded by self servo write on the flat section of the disk in embodiments of this invention.

Embodiments of the present invention relate to a discrete track medium and a pattern medium, a method for writing servo information on these magnetic recording media, and a hard disk drive provided with these magnetic recording media.

An object of embodiments of this invention is to provide a patterned media including servo information recorded by self servo write on the servo region.

Another object of embodiments of this invention is to provide a method for writing servo information by self servo write on the servo region of the patterned media.

A still further object of embodiments of this invention is to provide a hard disk drive with high recording density and large storage capacity capable of storing the patterned media.

In order to attain the above object, the magnetic recording media of embodiments of this invention is characterized in including data regions magnetically separated into multiple tracks, and servo regions made from flat sections, and information showing the boundary with the servo regions in the rear section or front section of the data region.

In order to attain another object, the method for writing servo information in embodiments of this invention is characterized in that the magnetic recording media built into the hard disk drive includes data regions magnetically separated into multiple tracks, and servo regions made from flat sections and when writing servo information in the servo region on the magnetic recording media using the magnetic head in the hard disk drive, the rear section or front section of the data regions on the magnetic recording media are detected, and servo information then written on the servo region after a specified time has elapsed after detecting the rear section or the front section.

In order to obtain a still further object, the hard disk drive of embodiments of this invention is characterized including data regions magnetically separated on multiple tracks, and servo regions made from flat sections, and a magnetic recording media containing servo information written by self servo write in the servo region, and a magnetic head for reading or writing the magnetic information on the data region of the magnetic recording media.

Embodiments of this invention are capable of writing servo information by self servo write (SSW) on the servo region of a patterned disk such as a discrete track medium. Moreover, the hard disk drive containing a pattern medium with servo information written by self servo write is superior to the pre-patterned servo method and acquires servo characteristics the same as by magnetic servo write so a large recording volume capacity at a high density can be obtained.

Certain embodiments of this invention are described next. The following descriptions and drawings have been abbreviated and simplified as needed. Identical elements in the drawings have been assigned the same reference numerals. Redundant descriptions have been omitted as necessary for better clarity. Servo writing is described using the hard disk drive (HDD) as an example of the magnetic recording systems.

Figure 2:
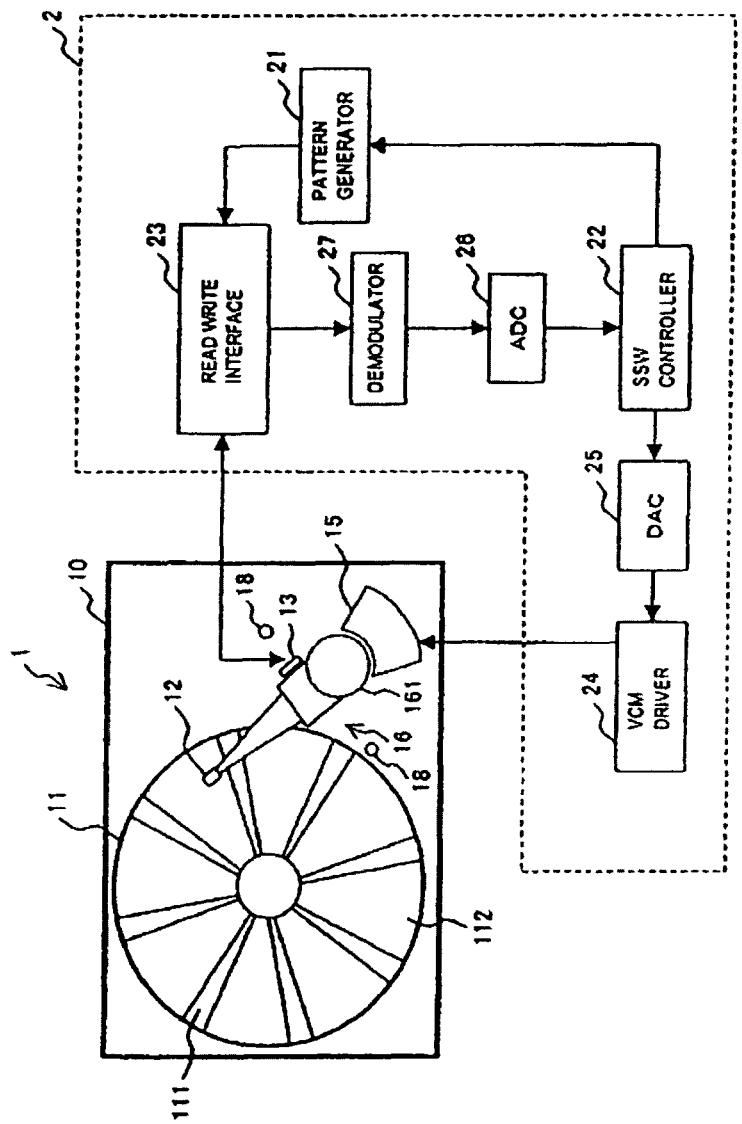
FIG. 2 is a diagram showing the logical stricture of the servo write controller for controlling servo write on the HDA (head disk assembly) and the HDA relating to embodiments of this invention.

FIG. 2 is a block diagram showing a concept view of the structure of the servo write controller 2 for controlling the head disk assembly (HDA) 1 and servo write on the HDA 1. The HDA 1 is a structural element of the HDD and contains a case 10 including a base and a top cover for blocking the upper opening of the base. The HDA 1 includes a magnetic disk 11, a magnetic head (head slider) 12, a preamp IC 13 as one example of a circuit component, a voice coil motor (VCM) 15 and an actuator 16 housed inside the case. The actuator 16 supports the head slider 12 at the tip. The preamp IC 13 is clamped to the actuator 16 by way of a circuit board (not shown in drawing), and more specifically is clamped near the rotating axis 161 of the actuator 16.

Besides the HDA 1, the HDD further contains a control circuit board clamped to the outer side of the case 10. An IC for executing the signal processing and control processing is mounted on this control circuit board. In this embodiment (or mode) the circuit on this control circuit board is not used for servo writing, instead the servo write controller 2 controls the servo write operation. In this embodiment the servo writing directly controls the internal mechanism in the HDA 1 and writes servo data (servo patterns) onto the magnetic disk 11. The magnetic disk 11 is a non-volatile storage disk for storing data magnetized in magnetic layers.

This type of servo writing is called self servo write (SSW). SSW utilizes each structural element within the case 10 to write the servo data used for reading and writing the user data onto the magnetic disk 11. This servo data is hereafter called product servo pattern. In this embodiment, the control circuits in the HDD can also perform servo write.

The servo write controller 2 controls and executes the SSW in this embodiment. This servo write controller 2 includes an SSW controller 22. This SSW controller 22 controls the entire SSW operation. The SSW controller 22 controls the positioning of the head slider 12 as well as generating of patterns. The SSW controller 22 is also capable of functioning as a processor operating according to pre-stored micro codes. The SSW controller 22 executes control processing according to requests from external information processing devices, and sends the required information such as error information to the information processing device.

To write patterns onto the magnetic disk 11, the SSW controller 22 issues commands to the pattern generator 21 and the pattern generator 21 then forms the specified pattern. A read/write interface 23 converts the pattern generated by the pattern generator 21 and send the pattern signal to the preamp IC 13. The preamp IC 13 amplifies the signal and transfers it to the head slider 12. The head slider 12 then writes the pattern on the magnetic disk 11.

The SSW controller 22 utilizes the signal read by the head slider 12 to control the actuator 16, and to shift and position the head slider 12. More specifically, the SSW controller 22 inputs the signal read by the head slider 12 into a demodulator 27 by way of the read write interface 23. The AD converter 26 then AD converts the read signal demodulated by the demodulator 27 and inputs it to the SSW controller 22. The SSW controller 22 analyzes the digital signal obtained from the AD converter 26, and calculates a numerical control signal.

The SSW controller 22 then sends that value to the DA converter 25. The DA converter 25 converts the acquired data to analog (DA) and supplies a control signal to the VCM driver 24. The VCM driver 24 supplies a control current to the VCM 15 based on the control signal, and shifts and positions the head slider 12. In these specifications, the apparatus including structural elements other than the servo write control device 2 and the magnetic disk 11 for the HDA 1 are called the self servo track writer (SSTW). In other words, the SSTW writes servo patterns on the recording surface of magnetic disk 11.

Figure 3:
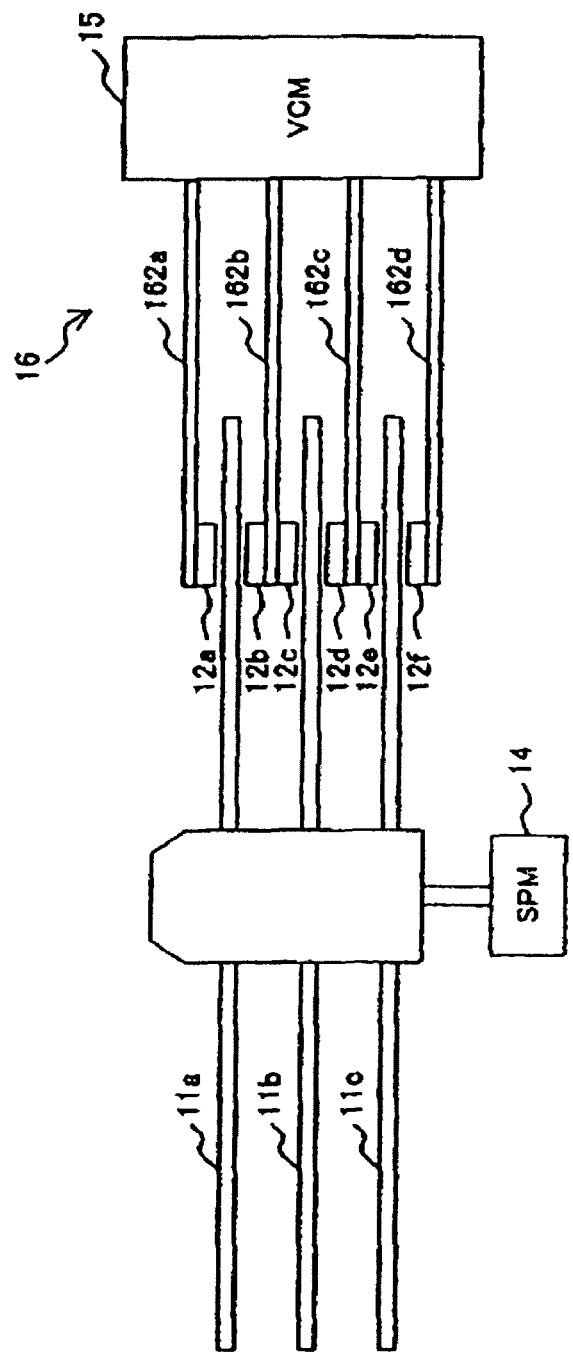
FIG. 3 is a drawing showing the internal stricture of the HDA relating to embodiments of this invention.

The HDA 1 of this embodiment (mode) includes multiple magnetic disks 11a-11c as shown in FIG. 3. Each of these magnetic disks 11a-11c is clamped to the rotating spindle of the spindle motor (SPM) 14. The SPM 14 rotates these clamped magnetic disks 11a-11c at a specified angular speed. Both the magnetic disks 11a-11c surfaces serve as recording (or write) surfaces. The HDA 1 contains multiple head sliders 12a-12f that correspond to the respective recording surfaces.

Each of the head sliders 12a-12f is clamped to the actuator 16. More specifically, the actuator arm 162a supports the head slider 12a. The actuator arm 162b supports the head sliders 12b and 12c. The actuator arm 162c supports the head sliders 12d and 12e. The actuator arm 162d supports the head slider 12f.

The actuator 16 is linked to the VCM 15 and by rotating around the rotating shaft 161, moves the head sliders 12a-12f along the radius of the record (write) surfaces of the magnetic disks 11a-11c. Each of the head sliders 12a-12f contains a slider and a magnetic head as a thin film element formed on the slider. The magnetic heads contain a write element to convert the electrical signals into a magnetic field according to the write data; and a read element to convert the magnetic field from the magnetic disk 11 into electrical signals.

The preamp IC 13 selects one head slider for reading data from among the multiple head sliders 12a-12f, amplifies the read signal reproduced by the selected head slider to a fixed gain, and outputs it to the servo write controller 2. The preamp IC 13 amplifies the signal from the servo write controller 2 and outputs that signal to the selected head slider. Usually all head sliders 12a-12f are selected simultaneously during writing of product servo patterns.

Figure 11A:
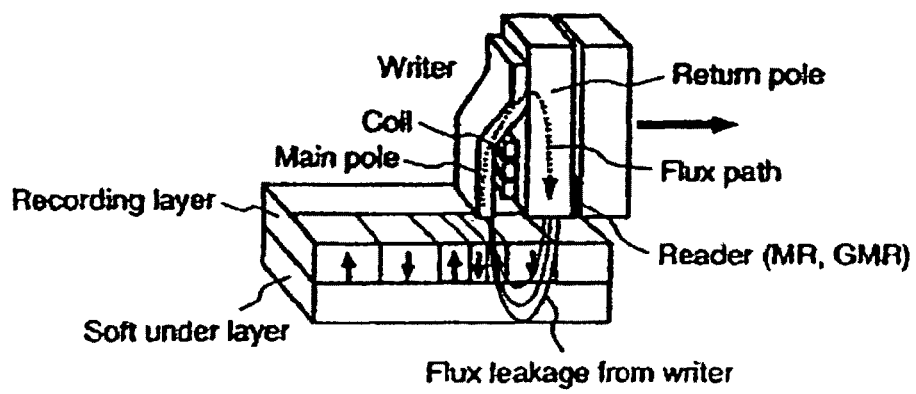
FIGS. 11(a) and 11(b) are drawings showing the read process and the recording (write) process for perpendicular magnetic recording in one embodiment.
Figure 11B:
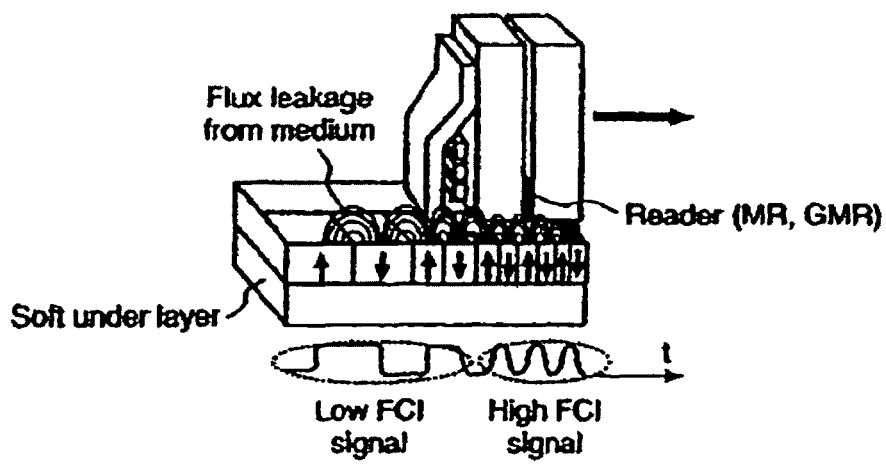

The write process and the read process in perpendicular magnetic recording are briefly described here while referring to FIGS. 11(a) and 11(b). The record head (writer) is mainly made up of a main pole and a coil and a return pole. The recording medium is made up of a recording layer and a soft under layer. When recording (or write) current is made to flow in the coil and induces a magnetic recording field, a magnetic flux leaks from the gap between the main pole and the return pole. This magnetic flux reaches the soft under layer which has low magnetic resistance (magnetic flux tends to propagate easily), and the magnetism is recorded perpendicularly on the recording layer. The read head is mainly formed from a magnetoresistive (MR) element and a giant magnetoresistive (GMR) element. The interplanar component of the leakage magnetic flux from the recording medium reaches a maximum at the boundary of each magnetic domain. The MR element and the GMR element at this time generate a maximum read output corresponding to the magnetic polarity. The same figure shows the read waveform when the magnetism is at a low density (low FCI: Flux change per inch) and when at a high density (High FCI).

Figure 1B:
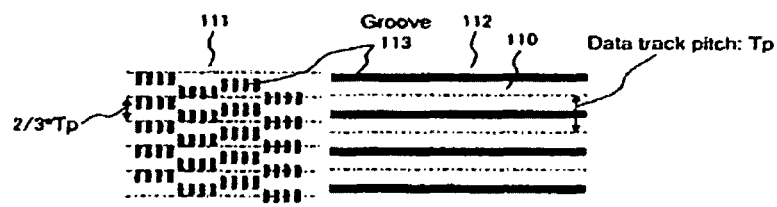

Returning to FIG. 2, the SSW forms multiple servo regions 111 at a specified angle on the recording surface of magnetic disk 11, extending along the radius from the center of the magnetic disk 11. The example in FIG. 1 shows eight servos. Each of the servo regions 111 contain product servo patterns for controlling the positioning of the head sliders 12 for reading and writing the user data. A data region 112 is the region between two adjacent servo regions 111, and holds the user data. The servo region 111 and the data region 112 are installed at mutually specified angles.

Figure 4:
FIG. 4 is a drawing showing the data format of the product servo pattern in the servo sector.

FIG. 4 shows the data format for the product servo pattern 115 for one servo sector. A product servo pattern 115 in one servo sector is formed in one servo section along the circumference, and product servo patterns 115 are formed in multiple servo sectors along the radius on one servo region 111. The product servo pattern 115 includes a preamble (PREAMBLE), a servo address mark (SAM), a track ID (GRAY) made up of a gray code, a servo sector number (PHSN) (optional) and a burst pattern (BURST). The SAM is a section indicating the start of the actual information such as the track ID, and the SAM signal serving as a timing signal that usually appears when the SAM is found, correlates accurately to the position where the information is written on the magnetic disk 11.

The burst pattern (BURST) is a signal showing even more precisely the position on the servo track indicated by the track ID. The burst pattern typically includes four amplitude signals A, B, C, and D written in a staggered shape in slightly different positions on the circumference on each servo track (See FIG. 5.). Each of these bursts is a single frequency signal at the same period as the preamble (PREAMBLE).

Figure 5:
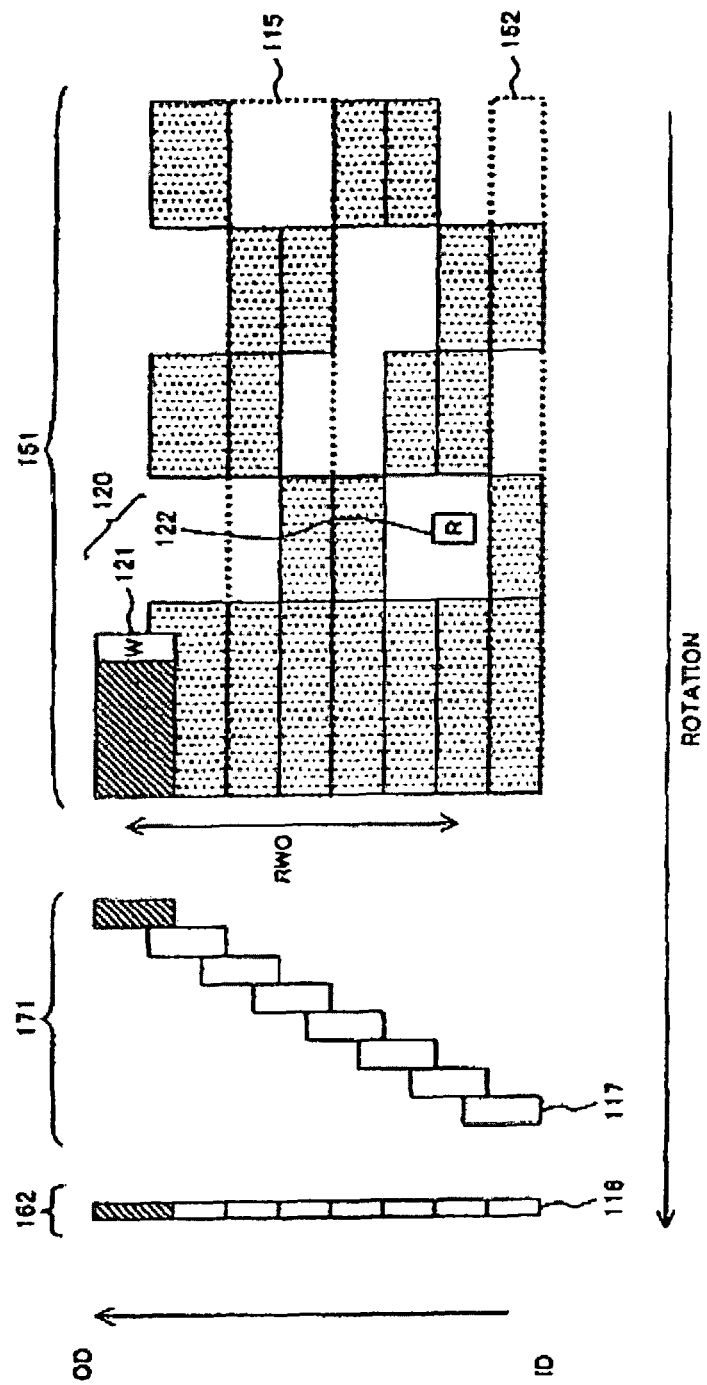
FIG. 5 is a diagram showing the write method and the write pattern on the recording surface by the SSTW relating to embodiments of this invention.

FIG. 5 is a drawings showing the pattern and the writing method for that pattern that the SSTW of this embodiment writes on one servo region 111 on the recording surface. FIG. 5 shows a pattern corresponding to one servo sector. Besides the product servo pattern 115, the SSTW (self servo track writer) writes the timing pattern 1 and the radial pattern 117. The timing pattern 116 is a pulse pattern, and the radial pattern 117 is a burst at a specified frequency. One sector on the SSW of this embodiment therefore includes a region 151 where the product servo pattern 115 is written, a region 161 for writing the timing pattern 116 of one sector and a region 171 for writing the radial pattern 117 of one sector.

The SSTW (self servo track writer) searches the patterns (timing pattern 116 and radial pattern 117) on the magnetic disk 11, and writes the next pattern at a position shifted along the radius just by the read-write-offset, while performing timing control (timing control along the circumference) and spatial control (position control along the radius) of the head element 120 on the head slider 12 by utilizing the time and spatial information obtained from that signal.

The read write offset (RWO) is a gap along the radius between the write element 121 and the read element 122 on the head element 120. More specifically, the RWO is the distance along the radius of the magnetic disk 11 between the centers of the read element 122 and the write element 121. This read write offset (RWO) changes according to the position along the radius of the magnetic disk 11. The positions of the write element 121 and the read element 122 are also shifted (from each other) along the circumference. The gap along this direction is called the read write separation.

The SSTW of this embodiment selects one among the multiple head elements 120 (for example head element on the head slider 12b in FIG. 2) and reads the pattern on the recording surface via that selected head element 120. This head element 120 is called the propagation head in these specifications. The SSTW controls the actuator 16 by using the signal read by this propagation head, and all the head sliders 12a-12f simultaneously write each pattern on the recording surface.

As shown in FIG. 5, in this embodiment, the read element 122 is positioned farther to the inner circumference (ID) side of magnetic disk 11 than the write element 121. The head sliders progressively write the pattern from the inner circumferential side towards the outer circumferential side. Writing the pattern from the inner circumferential side allows the read element 122 to read the pattern previously written by the write element 121. The write element 121 can in this way write a new pattern while the head element 120 is being positioned via the pattern read by the read element 122. The SSW can also start from the outer side of the magnetic disk 11 by changing the positions of the write element 121 and read element 122.

More specifically, the SSTW positions the head element 120 by using the radial pattern 117, and measures the pattern write timing by using the timing pattern 116 as a reference. The radial pattern 117 is therefore one servo pattern for positioning control by the SSW. The write elements 121 of each head element 120 write (a portion) of the product servo pattern 115, after predetermined time has elapsed since the read element 122 of the propagation head read the timing pattern 116. The next sector timing pattern 116 is written based on the timing pattern 116 that was read out in the previous sector.

The write element 121 as shown in FIG. 5, writes each product servo pattern 115 so as to overlap one section along the radius. In other words, a portion of the product servo pattern is overwritten by an outer circumferential pattern when forming each product servo pattern. FIG. 4 shows three previously written product servo patterns 115. The write element 121 in FIG. 4 is in the process of forming the fourth servo product pattern from the inner circumferential side.

The write element 121 writes one-half of the product servo pattern with one rotation of the magnetic disk 1. In these specifications, a track equivalent to half of this product servo pattern is called the servo write track. The reference numeral 152 shows the product servo pattern for one servo write track. The track for the product servo pattern is called the servo track. The track pitch of the servo write track is one-half of the servo track pitch. Seven servo write tracks are already written in the example in FIG. 5. The write element 121 is in the process of writing the eighth servo write track from the inner circumferential side.

The timing patterns 116 in the same sector are formed at essentially identical positions along the circumference. However each radial pattern 117 is formed at different positions along the circumference versus adjacent radial patterns 117 along the radius. Namely, the circumferential positions of the adjacent radial patterns 117 are offset from one another. Each of the adjacent radial patterns 117 is also formed overlapped along the radius. In FIG. 5, the radial patterns 117 are sequentially offset towards the right side of the drawing, towards the outer circumference, and further are written at positions offset to the left side in the figure on the outer circumferential side of the track.

The fabrication sequence of the timing pattern 116, the radial pattern 117, and the product servo pattern 115 are described. First of all, the timing pattern 116, the radial pattern 117, and the product servo pattern 115 are formed in sequence from the first sector to the final sector on one cylinder (track). Namely, SSW of one cylinder is ideally completed in one rotation of the disk 1. Multiple disk rotations may be needed due to the actual circumstances. Next, shifting to one cylinder on the outer circumference, the timing pattern 116, the radial pattern 117, and the product servo pattern 115 are formed in sequence in the same way from the first sector to the final sector. Here, the process proceeds from the inner circumference (ID) to the outer circumference (OD) but needless to say, the process may process from the OD to the ID.

Figure 6:
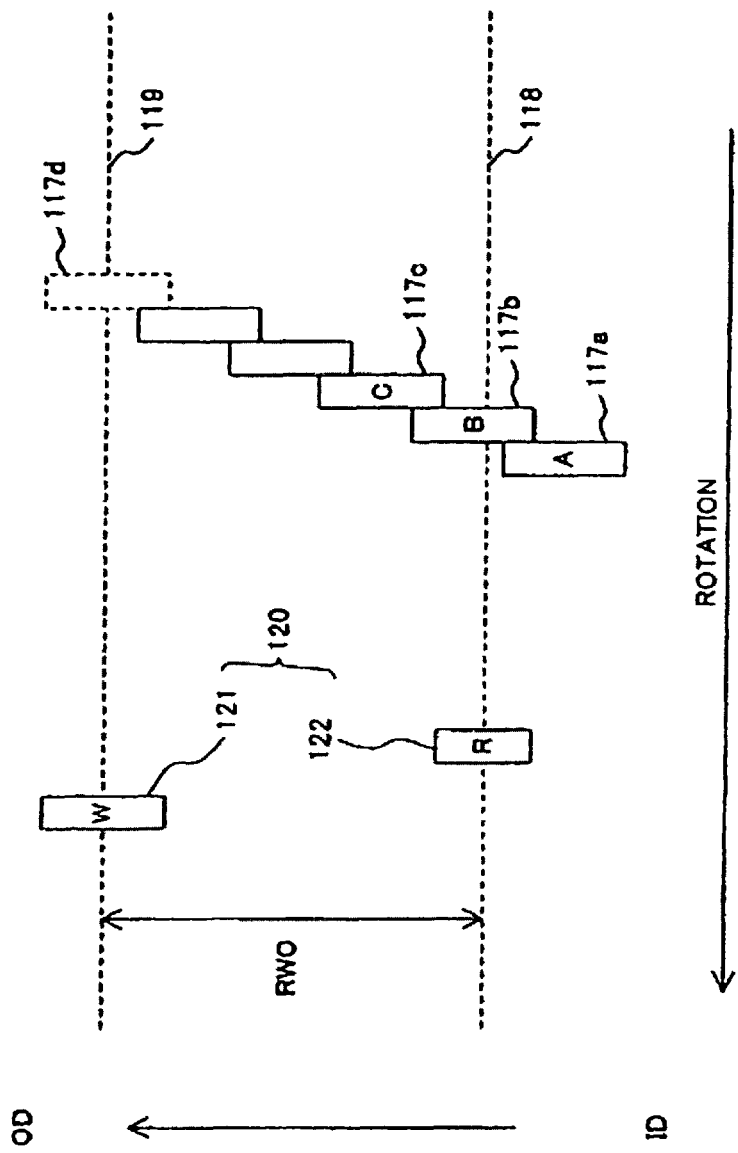
FIG. 6 is a diagram for showing an example of positioning the read element at the target position, and writing a pattern with the write element by the SSTW relating to embodiments of this invention.

The SSW controller 22 positions the head by using signals read from the radial pattern 117. An example of positioning the read element 122 at a target position 118 is described in detail using FIG. 6. The dimension along the radius of read element 122 in FIG. 6 is the read width, and the write element 121 dimension is equivalent to the write width. The magnetic disk 11 rotates from right to left in the figure, and the read element 122 moves from left to right in the figure. The write element 121 writes on a servo write track corresponding to the target position 119.

In order to position the write element 121 at the target position 119, the SSW controller 22 positions the read element 122 at the target position 118 on the read-write offset (RWO) inner circumferential side from the target position 119. The read element 122 reads the radial patterns 117a, 117b and 117c. The SSW controller 22 finds the function values (called the PES value) for the amplitude (set as A, B and C) for the radial patterns 117a, 117b, 117c, and positions the read element 122 to reach each of these target values.

The write element 121 writes the radial patterns 117d while the read element 122 is positioned at the target position 118. Typically, in the process for writing each of the patterns, the target positions for read element 122 are offset along the radius and do not match with the center of the radial patterns 117.

There is an initial sequence in SSW for measuring the head characteristics before starting to write the product servo patterns. As can be understood from the description while referring to FIG. 5 and FIG. 6, in SSW the patterns are written by utilizing the characteristics of the head element 120 such as the read-write offset and the write width, etc. More specifically, the write width determines the track pitch. In other words, a track pitch can be obtained that matches the write width of each head, and is called adaptive track pitch. The read-write offset determines the distance between the tracks for reading and the tracks for writing.

Therefore accurately identifying characteristic values of the head element 120 in the SSW initial sequence is important. More specifically, besides measuring the write width and the read-write offset, the initial sequence also measures the base noise. The characteristic values for head element 120 differ in each HDD and so must be measured on each HDD. The SSW controller 22 executes this sequence.

The head characteristic values are typically measured with the actuator 16 pressed against the crash stop 18 (See FIG. 2). The crash stop 18 is a member for restricting the swiveling movement of actuator 16 by colliding with the actuator 16, and is installed on both the inner circumferential and outer circumferential sides of the actuator. In measuring the write width and the read-write offset, the write element 121 erases a specified region and the write element 121 writes a burst pattern in that erased region. Then, the signal read by the read element 122 from the burst pattern that was written is utilized to identify the write width and the read-write offset.

The base noise measurement can be made by the write element 121 erasing one track and the read element 122 then reading that erased track. The base noise is used for determining the amplitude of the signal that was then read. More specifically, the measurement is made multiple times, the average value of the measurements is taken, and then utilized in writing the product servo pattern.

In this initial sequence, the region used for this head measurement is preferably subjected to DC erase and not AC erase. DC erase magnetizes the magnetic layers in the recording surface along one direction. Using DC erase is particularly important in regions utilized for base noise measurement. DC erase is important because the base noise is lower than in AC erased regions. The SSW controller 22 specifies the signal threshold from the specified noise level. The SSW controller 22 utilizes this threshold (value) when setting the actual signal intensity versus the signal that was read. Therefore, when the base noise is large, the margin versus this threshold value is small, and consequently the SSW yield deteriorates. So preferably the base noise is measured by making the write element 121 read out a region that was erased by DC.

The method for forming the servo pattern for the SSW of one embodiment of this invention was described above. The pre-patterned servo of the related art is next compared with this embodiment while referring to FIGS. 1(*a*) and 1(*b*). FIGS. 1(*a*) and 1(*b*) indicate the burst section for a servo pattern on one servo sector, and the subsequent user data region following that section. A groove 113 in the data region 112 contains multiple tracks 110 that are magnetically separated; FIG. 1(*b*) shows an example utilizing the pre-patterned servo of the related art. FIG. 1(*a*) shows an example utilizing the SSW of the present embodiment. In FIG. 1(*b*), Tp denotes the data track pitch. The servo track pitch here is two-thirds of the Tp. The data track pitch and the servo track pitch generally do not match each other in most cases. At times when the servo positioning characteristics do not have adequate linearity, a servo pitch smaller than the data track pitch is utilized to maintain the linearity.

FIG. 1(*a*) shows a magnetic record medium containing a pattern forming section (data region) 112 and a flat section (servo region) 111. The pattern forming section 112 is a discrete track 110 but can also be applied to bit patterns. The flat section 111 contains servo patterns 114 magnetically recorded by SSW. The servo write head is what determines the servo track pitch for those servo patterns. In other words, adaptive servo pitch can be applied to those servo patterns. In the pre-patterned servo of FIG. 1(*b*) on the other hand, the servo pitch must be decided while still in the disk patterning stage, so that a servo pattern cannot be obtained that matches the actual head to be used.

As described earlier, when using SSW, a self servo write timing pattern or radial pattern (also called the propagation pattern) always remains on the servo region on the outermost circumference or innermost circumference of the disk region.

The servo pattern and track pattern must be consecutively well formed along the circumference. Though as already related, this problem does not occur on magnetic servos and pre-patterned servos, in methods where the servo pattern is magnetically recorded later on in the plane region in this embodiment, there is no way to determine what timing at which to start excitation of the magnetic head (in other words, start the servo write) unless there is some type of circumference information. Information on the disk circumference must be obtained to provide the timing to the magnetic head. In the case of the above embodiment, the rear section or the front section of the disk region 112 contains pre-patterned grooves 128 as shown in FIG. 1(*a*). By utilizing this groove 128 as a reference, a SSW timing pattern 116 can be magnetically recorded on the plane region 111.

Figure 7:
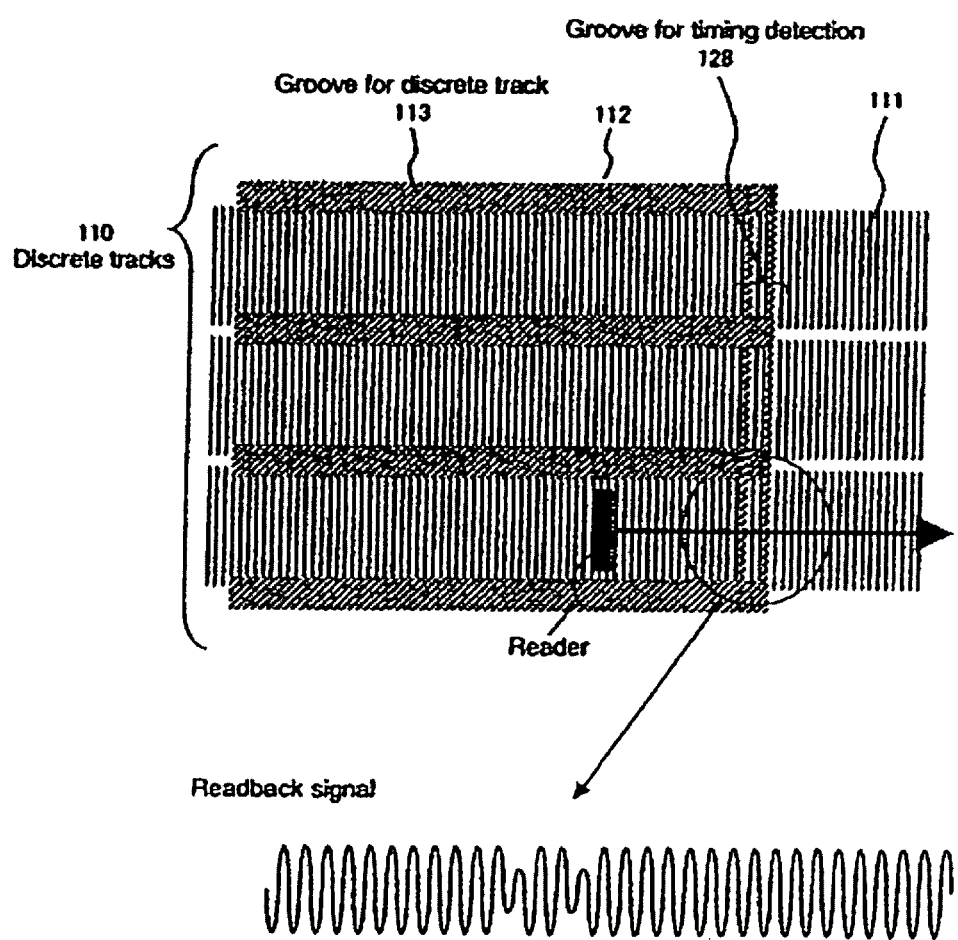
FIG. 7 is a drawing of a timing detection pattern formed in advance by patterning the disk, in order to control the circumference timing, required for self servo write in this embodiment.

Another example of timing patterns required for detecting the start of SSW writing is shown while referring to FIG. 7. In FIG. 1(*a*), a timing pattern 116 for SSW was magnetically recorded in the plane region 111 based on the pre-patterned groove 128. In the example shown in FIG. 7 however, the groove 128 formed by pre-patterning on the front section or rear section of data region 112 can be directly used as a timing pattern. As described previously, during servo write on the flat section 111 on a magnetic disk containing flat sections 111 and pattern forming sections 112, some type of method must be utilized to detect the boundaries of the flat sections 111 and pattern forming sections 112. FIG. 7 shows the case where the discrete track 110 is formed on the pattern forming section 112 that will become user data. As shown in the figure, the front section or rear section of the dot pattern, or the discrete track 110 contain patterns (grooves) 128 along the radius. These radial patterns (grooves) 128 can be formed simultaneously with the pre-patterning of the pattern forming section 112. Single frequency information for example of 400 MHz can be magnetically recorded on these grooves and when read can yield a read waveform such as shown in the lower section of the same figure. In other words, changes in amplitude in the read waveform can be detected, and utilized to start detecting the SSW writing. The boundary of the pattern forming sections and flat sections can therefore be accurately and easily detected by forming timing detection patterns (SSW timing patterns) on the front section or rear section of the pattern forming section in this way, and servo writing performed on the flat sections. Two radial patterns (grooves) were utilized here as the timing detection patterns. Needless to say, however, one pattern may be used, and three or more patterns may be used. By using an appropriate number of patterns and an appropriate pattern width (distance along the circumference, namely equivalent to time) with good read signal quality and good patterning machining accuracy, these patterns can function as high-performance timing patterns.

Figure 8:
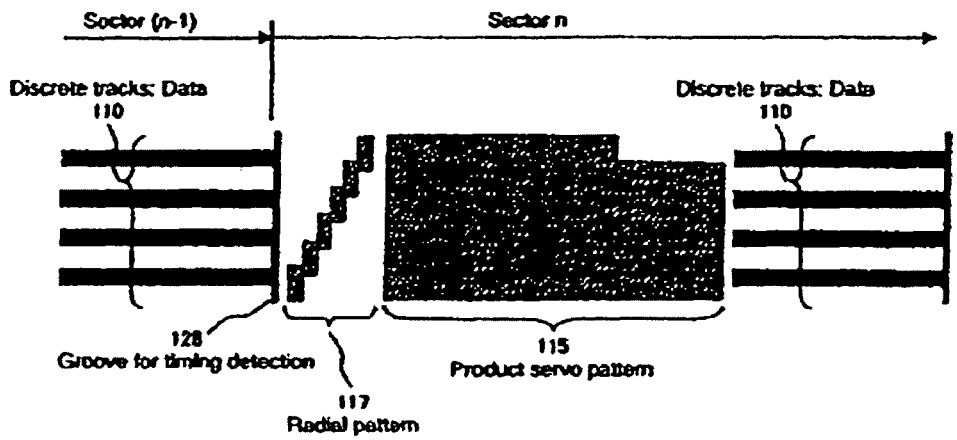
FIG. 8 is a diagram showing the user data region made from the discrete track, and the positional relationships of the magnetically recorded product servo pattern and the magnetically recorded radial pattern, and the timing pattern made by pre-patterning in this embodiment.

FIG. 8 is a diagram showing the user data region made up of discrete tracks, as well as the positional relation of the timing pattern (or groove for timing detection) 128 formed by pre-patterning, the magnetically recorded radial patter 117 and the product servo pattern 115. This same figure shows from the data region rear end of a first (n−1)th sector and continues through the entire data region of the n-th sector. The timing pattern in FIG. 4 was described as being magnetically recorded on the servo region. However in FIG. 8, a timing pattern formed by pre-patterning (groove 128) is utilized as described in FIG. 7. Also, the radial pattern 117 cannot be magnetically recorded on the pattern forming section 112 and so is magnetically recorded on the plane region (servo region) 111.

The description next shifts to the radial direction on the disk. The magnetic head must write the servo track (servo pattern) along the locus or orbit of a data track made up of a pre-patterned discrete track or bit patterns. However, when a disk pre-patterned with data tracks is attached to a spindle motor, the eccentricity of the data tracks is as large as several dozen micrometers. In other words, the center of the spindle motor rotation will deviate from the center of the data track locus, so that the magnetic head is not slaved to the data track, consequently causing the problem that servo writing along the data track is impossible. Other possible causes for this eccentricity are that achieving a perfectly round (nanometer scale) data track pattern is impossible and that the data track is already eccentric in the patterning stage, etc. A servo write method is therefore needed that is capable of countering the eccentricity occurring along the disk radius.

A servo write method for correcting this eccentricity between the pattern forming section (data track) and the flat section (servo track) is implemented by the following sequence. (1) Self servo write is first performed according to the timing pattern. (2) Data is recorded on the data region at a single frequency (for example, several dozen to 100 MHz) while slaving (following) the magnetic head to the servo pattern written by SSW. (3) A read (or read-back) waveform is acquired from the single frequency recording (write) pattern that was just recorded in the above (2) state, or in other words while the magnetic head is in a slaved (following) state. The read waveform is at this time modulated by the read head cutting across the groove on the discrete track. This modulation envelope is made up of a 1st order synchronization oscillation (RRO: Repeatable Run Out). (4) The read waveform envelope is analyzed, and its RRO value found, and the eccentricity quantity calculated in order to cancel out the modulation component in the read waveform. (5) Self servo write is again performed based on the eccentricity quantity in (4), and a servo track is obtained along the patterned data track. (6) The above steps (1) through (5) are repeated several times as needed to achieve servo write with even higher accuracy (reduced eccentricity).

A servo write method for correcting eccentricity between the pattern forming section (data track) and the flat section (servo track) is implemented in another embodiment by the following sequence. (1) Timing information for one circumferential portion of the disk (namely, all sectors) relating to the previous timing pattern is acquired from the read waveform using the method in FIG. 7. (2) This acquired timing information is mainly information on changes over time in each sector according to the disk eccentricity. In other words, a function (1st order synchronization oscillation) reflecting the eccentricity state is obtained so the amount of eccentricity is calculated based on this acquired timing. (3) Self servo write is performed based on the eccentricity amount and a servo track is obtained along this patterned data track. (4) The above steps (1) through (3) are repeated several times as necessary to achieve servo write with even higher accuracy (reduced eccentricity).

A servo track (flat section) was successfully magnetically recorded along the data track (pattern forming section) by the above method. Next, the amount of eccentricity must be stored in the HDD as an eccentricity compensation value in order to make that disk possessing eccentricity function as an HDD device by canceling out that eccentricity. If this eccentricity compensation value is a fixed (ideal) value for all cylinders then it may be stored in a semiconductor memory such as a RAM since a high-speed response is not needed and the capacity is small. However the actual eccentricity compensation value (namely, the function value and format) differs in each cylinder, and rather than just a 1st order synchronization oscillation for each sector, may also include weighted higher-order oscillations. The data size of this type of eccentricity compensation is large and high-speed access is required for control so another method must be employed.

Figure 9:
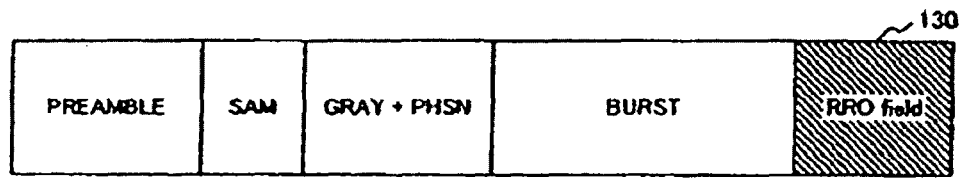
FIG. 9 is a drawing showing the RRO position error signal section used for controlling the positioning along the radius, and recorded in the servo signal on the flat section of the disk in this embodiment.

The servo pattern shown in FIG. 9 is utilized for storing the eccentricity compensation value. Components as already described include preamble (PREAMBLE), a servo address mark (SAM), a track ID (GRAY) made up of a gray code, a servo sector number (PHSN) (optional) and a burst pattern (BURST), as well as an 8 bit RRO field 130 between the burst pattern and data region. An RRO position error required in the process for canceling out the SSW eccentricity is recorded in the RRO field 130. The position of the RRO field 130 need not be limited to the position in these specifications. Moreover an 8 bit space was secured but this space (RRO field) is not limited to that value. Also, providing RRO fields in all the servo sectors improves the speed and accuracy for canceling out eccentricity during SSW.

Figure 10:
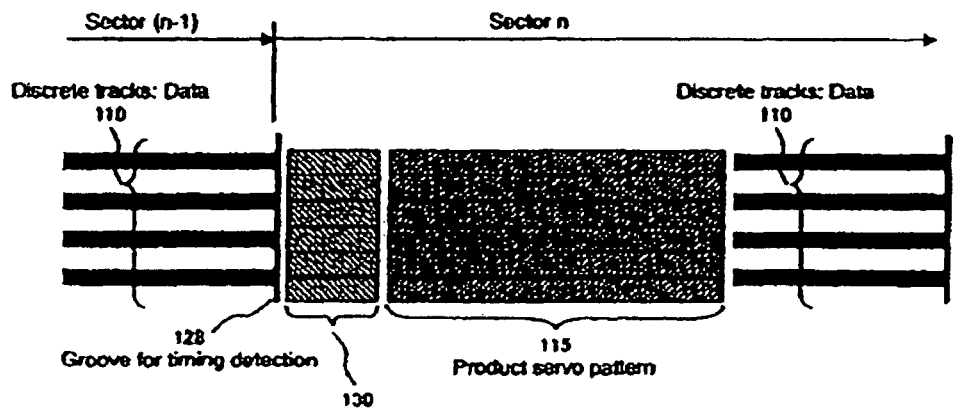
FIG. 10 is a drawing showing another example of the RRO position error signal section used for controlling the positioning along the radius, and recorded in the servo signal on the flat section of the disk in this embodiment.

FIG. 10 shows another embodiment relating to a method for storing the eccentricity compensation value. The plane region section shown in FIG. 8 for magnetically recording the radial pattern 117 is utilized again as the RRO field 130, and the eccentricity compensation value is recorded here. The radial pattern 117 in FIG. 8 is not required after SSW ends, and so this region can be re-utilized as the RRO field 130, and enhance the format efficiency (user data capacity) of the HDD.

Utilizing the above described technology allows servo writing onto a patterned disk, and yields the same servo characteristics as magnetic servo writing and is superior to pre-patterned servos. A HDD with a pattern disk can be manufactured, to therefore achieve a HDD with a high-density, large recording capacity. By fabricating a HDD utilizing a discrete track media, and by utilizing the servo write technology of this embodiment, a track density was obtained that is 30 percent higher than HDD using the plane medium of the related art.

Particular embodiments of the invention were described above, but the invention is not limited by these embodiments. Each element of these embodiments may be easily changed, added to or converted within the scope of this invention by one skilled in the known art. For example, embodiments of this invention are not limited to a HDD, and may be utilized with other data storage devices. The servo write controller 2 of this embodiment may be a separate device from the HDD, but a servo write control function can be built into the HDD control circuits.

What is claimed is:

1. Magnetic recording media comprising:
   one or more data regions magnetically separated into a plurality of tracks;
   a first groove separating each data region into multiple tracks; and
   one or more servo regions made on flat sections, each servo region comprising servo information in a servo pattern having an adaptive servo track pitch based on a write width of a magnetic head used to write the servo pattern,
   wherein the magnetic recording media contains information showing a boundary with the one or more servo regions in a rear section or a front section of the one or more data regions.

2. The magnetic recording media according to claim 1, further comprising:
   a second groove positioned at the boundary with the one or more servo regions in the rear section or the front section of the one or more data regions.

3. The magnetic recording media according to claim 2, wherein the second groove is formed at about right angles (90 degrees) to the first groove.

4. The magnetic recording media according to claim 1, wherein the servo information contains position error caused by an eccentricity of the one or more data regions and the one or more servo regions.

5. A method for writing servo information on the servo region of the magnetic recording media according to claim 1 by utilizing the magnetic head of a hard disk drive, the method comprising:
   writing a radial pattern and a timing pattern on the first servo region of one track among the multiple tracks;
   positioning the magnetic head by using the radial pattern, and writing a product servo pattern based on the timing pattern after a specified time has elapsed;
   writing a timing pattern and a radial pattern on a next servo region based on the timing pattern after a specified time has elapsed;
   writing product servo patterns on the remaining servo regions of the multiple tracks by repeating the second step and the third step; and writing product servo patterns on the servo regions of the remaining tracks by using the timing patterns and servo patterns that were written.

6. The method for writing servo information according to claim 5, further comprising compensating for an eccentricity of the data region and the servo region of the magnetic recording media.

7. The method for writing servo information according to claim 6, wherein compensating for the eccentricity is implemented by detecting a position error due to the eccentricity of the data region and the servo region during the servo information writing, and utilizing the detected position error.

8. A hard disk drive comprising:
   magnetic recording media as recited in claim 1 containing servo information written by self servo writing on one of the servo regions; and
   the magnetic head that was used to write the servo pattern and also adapted for reading or writing magnetic information on the data region of the magnetic recording media.

9. The hard disk drive according to claim 8, wherein the servo pattern is not pre-patterned on the magnetic recording media.

10. The hard disk drive according to claim 8, wherein the servo information on the magnetic recording media contains a position error caused by an eccentricity of the one or more data regions and the one or more servo regions detected during self servo writing.

11. The hard disk drive according to claim 8, further comprising a second groove positioned at the boundary with the one or more servo regions in the rear section or front section of the one or more data regions.

12. The hard disk drive according to claim 11, wherein the second groove is formed at about right angles (90 degrees) to the first groove.

13. The system according to claim 8, wherein the adaptive servo track pitch of the servo information of the servo pattern of each servo region matches the write width of the magnetic head.

14. The magnetic recording media according to claim 1, wherein the servo pattern is not pre-patterned on the magnetic recording media.

* * * * *